SMITH & WESSON.
Revolver.
No. 1,059. Reissued Oct. 9, 1860.
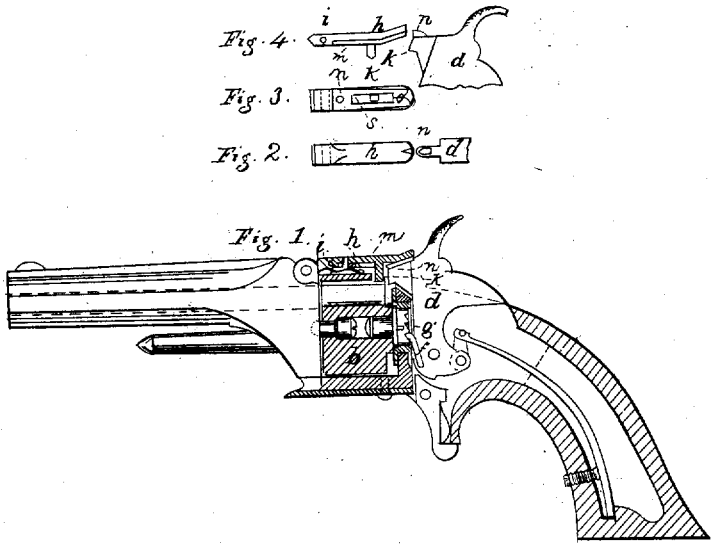
Horace Smith
David B. Wesson
By their Attorney
Sam. Cooper
Witnesses
Thos. R. Roach
Robt. Glover
N. PETERS, PHOTO-LITHOGRAPHER, WASHINGTON, D. C.

UNITED STATES PATENT OFFICE.

H. SMITH AND D. B. WESSON, OF SPRINGFIELD, MASSACHUSETTS.

IMPROVEMENT IN REVOLVING FIRE-ARMS.

Specification forming part of Letters Patent No. 24,666, dated July 5, 1859; Reissue No. 1,059, dated October 9, 1860.

*To all whom it may concern:*

Be it known that we, HORACE SMITH and DANIEL B. WESSON, both of Springfield, in the county of Hampden and Commonwealth of Massachusetts, have invented a new and useful Improvement in Revolving Fire-Arms; and we do hereby declare that the following is a full, clear, and exact description of the construction and operation of the same, reference being had to the accompanying drawings, making a part of this specification, in which—

Figure 1 is a partial section through a pistol with our improvements attached; Figs. 2, 3, and 4, views of the improvement detached.

In fire-arms with revolving cylinders it is necessary to provide a stop for the cylinder, to hold it firmly in its place while the charge is being ignited, in order to insure the entrance of the ball into the barrel, and it is furthermore necessary that this stop be entirely released from the cylinder before it commences to revolve, and that the stop shall be at liberty to take effect on the cylinder, and hold it constantly in its proper position from the time when the cylinder ceases revolving until after the charge has been ignited. In certain pistols this has been provided for by a stop-bolt which enters holes or notches in the end of the revolving cylinder, and is withdrawn to allow the revolution of the cylinder by a catch upon the side of the hammer, which strikes against the bolt as the hammer is raised, but does not withdraw it when the hammer descends. There are, however, other classes of pistols to which this form of bolt is not applicable, and for which a stop-bolt is required that may be applied to the outside or curved part of the cylinder, where it will be out of the way of the other parts of the lock.

To furnish such a stop is the object of our present invention, which consists in a spring stop-bolt which enters suitable cavities in the outside or curved part of the cylinder, and has upon its under side a projection, which is so arranged, in connection with a wedge-shaped projection upon the nose of the hammer, that when the hammer is raised its projection shall strike against the projection upon the under side of the spring-bolt, whereby the latter will be raised out of its notch and the cylinder permitted to turn; but when the hammer descends the projections slide past each other and the spring-bolt is not raised from its notch, one of the projections being furnished with a spring to permit it to yield as it comes in contact with the other.

*h* is the stop, (seen in detail in Figs. 2, 3, and 4,) which is composed of a small lever or finger, pivoted at *i*, and having a projection, *k*, (which we call the "stop-bolt,") on its under side, which projection or bolt enters corresponding cavities or notches in the curved surface of the cylinder *b* and holds it in its proper position, the bolt being held down by the spring *l* bearing upon the lever *h* back of pin *i*.

On the under side of the stop-bolt *h* is a spring, *m*, which is secured at one end to the stop and at the other is split into two portions, the outer ends of which are beveled to permit a wedge-shaped piece or projection, *n*, upon the hammer to enter between them. Farther back the two portions of the spring are cut away to form a recess, *s*, between them, and also a projection or shoulder. (Seen at *o*, Fig. 3.) The projection *n* is wedge-shaped, and is seen in Figs. 1 and 4 secured to the top of the nose of the hammer, the sharp end of the wedge being toward the stop and the broad or back end rounded on the top.

In Fig. 1 the parts are represented in the position which they occupy after the pistol has been discharged, the projection *n* upon the hammer resting within the recess *s*. As now the hammer is drawn back in the action of cocking the rounded back of the projection *n* bears against the projection or shoulder *o* and raises the stop, thus withdrawing the projection *k* from the cavity in the cylinder. So soon as this is effected the pawl *f* engages with the ratchet *g* upon the cylinder, which now commences to revolve. While the hammer is thus being drawn back the stop-bolt rests upon the top of the projection *n* until the cylinder has revolved sufficiently to prevent the bolt *k* from re-entering its notch, and then as the projection *n* passes out from beneath the stop-bolt the latter falls back and bears upon the surface of the cylinder until the hammer has been drawn back and cocked, and the cylinder thereby revolved sufficiently to present a new cavity or notch, into which the the stop *k* is thrown by the spring *l*, and the cylinder is held firmly in its place, ready for another discharge.

It has been stated that as the hammer is drawn back in the act of cocking the pistol the rounded back of the projection *n*, bearing against the projection or shoulder *o*, raises the stop-bolt and withdraws the bolt *k* from the cavity in the cylinder. We will now explain more particularly the essential feature of our invention—*i. e.*, the manner in which the hammer is thrown forward into the position represented in Fig. 1 without raising the bolt or releasing the cylinder. As the hammer comes down, the sharp edge of the projection *n* being presented to the beveled ends of the spring *m*, the wedge easily enters and passes through into the recess *s* without raising the stop or releasing the cylinder.

The above-described contrivance is simple, durable, and, being situated in the top of the strap of the lock-frame, is entirely out of the way of the lock and very accessible.

What we claim as our invention, and desire to secure by Letters Patent, is—

The spring-bolt *k*, applied to the outer or curved part of the cylinder, in combination with the nose of the hammer, one of them being furnished with a wedge-shaped piece or projection and the other with a spring-projection, for the purpose specified.

HORACE SMITH.
DANIEL B. WESSON.

Witnesses:
J. M. HALL,
N. B. CLARKE.